United States Patent [19]
Lange et al.

[11] Patent Number: 5,017,781
[45] Date of Patent: May 21, 1991

[54] READ-OUT SYSTEM FOR A LUMINESCENT STORAGE SCREEN IN AN X-RAY DIAGNOSTICS INSTALLATION

[75] Inventors: Gottfried Lange; Hans-Erich Reinfelder, both of Erlangen; Guenther Tressl, Bubenreuth, all of Fed. Rep. of Germany

[73] Assignee: Siemens Aktiengesellschaft, Munich, Fed. Rep. of Germany

[21] Appl. No.: 418,256

[22] Filed: Oct. 6, 1989

[30] Foreign Application Priority Data

Oct. 14, 1988 [EP] European Pat. Off. ........ 88117155.7

[51] Int. Cl.⁵ ............................................. G03B 42/00
[52] U.S. Cl. .................................. 250/327.2; 358/484
[58] Field of Search .................. 250/327.2 E, 327.2 F, 250/228; 350/96.1; 358/484

[56] References Cited

U.S. PATENT DOCUMENTS

| 4,568,984 | 2/1986 | Jürgensen et al. | 358/484 |
| 4,629,890 | 12/1986 | Goto et al. | 250/327.2 |
| 4,736,102 | 4/1988 | Morrone | 250/327.2 |
| 4,742,225 | 10/1988 | Chan | 250/327.2 |
| 4,801,188 | 1/1989 | Conrad et al. | 350/96.10 |
| 4,864,134 | 9/1989 | Hosol et al. | 250/327.2 |

FOREIGN PATENT DOCUMENTS 0209119 1/1987 European Pat. Off. .
0210505 2/1987 European Pat. Off. .

Primary Examiner—Constantine Hannaher
Attorney, Agent, or Firm—Hill Van Santen Steadman & Simpson

[57] ABSTRACT

A read-out system for a luminescent storage screen, in which a latent x-ray image is stored, includes a tubular, mirrored light guide having an opening through which light from the storage screeen, caused by scanning the storage screen line-by-line with a beam of read-out radiation, exits onto a detector. The detector is disposed so that its light-sensitive surface is parallel to the scanned line. The light guide has a slot-shaped passage for the scan beam, with ends closed by plates having mirrored surfaces.

10 Claims, 2 Drawing Sheets

READ-OUT SYSTEM FOR A LUMINESCENT STORAGE SCREEN IN AN X-RAY DIAGNOSTICS INSTALLATION

BACKGROUND OF THE INVENTION

1. Field of the Invention

The present invention is directed to an x-ray diagnostics installation having a luminescent storage screen for the latent storage of an x-ray image, and in particular to a read-out system for such an installation.

2. Description of the Prior Art

It is known to store a latent image generated by attenuated x-radiation using a luminescent storage screen. To read-out the latent image from the storage screen, the storage screen is caused to luminesce pixel-by-pixel by planar scanning with a scanning beam of read-out radiation. The light emitted in this manner by the luminescent storage screen is acquired by a light detector, with the collected light being converted into electrical signals, from which a visible image is constructed.

A read-out system of the type described above is described in U.S. Pat. No. 4,629,890, wherein a tubular light guide, having interior walls which are mirrored, is disposed over the luminescent storage screen which is to be read. The tubular light guide has a slot-shaped passage through which the scan beam, which is deflected within a plane by a rotatable mirror, can pass, so that a complete line of the storage screen is scanned and thereby excited to luminesce. As a result, the storage screen emits light pixel-by-pixel, which is reflected by the walls of the tubular light guide, and is conducted onto the input surfaces of two detectors, disposed side-by-side. The detectors generate respective electrical signals corresponding to the brightness of the light emitted by each pixel of the storage screen.

In a light guide of this type, the tube diameter cannot be excessively small, otherwise too many reflections, which excessively attenuate the light, will occur. The light which is incident on the end faces of the light guide must also be conducted with good efficiency.

Photomultipliers are known which have laterally disposed input windows, however, these types of photomultiplier have so-called incident light cathodes, i.e., the cathode plate is arranged at a distance behind the input window, so that the electrons emitted in the forward direction can be extracted as part of the output signal. In order for the major portion of the light emerging from the tubular light guide to be acquired, photomultipliers having lateral windows considerably larger in dimension than the optimum tube diameter would be required. There are no commercially available photomultipliers having a lateral window with such large dimensions.

Another type of photomultiplier uses a so-called transillumination cathode, which need only have a diameter of the size of the diameter of the photomultiplier tube, because the photo cathode in such photomultipliers is situated substantially at the tube ends. This produces an extremely bulky structure, because photomultipliers are flanged along the tube axis. A sensitivity curve which favors (i.e., is more sensitive at) the lateral regions of the storage screen results, due to the lateral arrangement of the detectors, because the light path at these regions between the storage screen and the detector is more direct, i.e., has fewer reflections. The most important image information, however, is usually in the central portion of the image, with the result being that this portion of the image is attenuated in comparison to the edge regions.

SUMMARY OF THE INVENTION

It is an object of the present invention to provide a read-out system of the type described for an x-ray diagnostics installation wherein the read-out unit has a compact and simple structure, and achieves a reliable read-out of the critical image portions in the central region of the storage screen.

The above object is achieved in accordance with the principles of the present invention in a read-out system having a detector including a tubular light guide having an opening through which light generated by a scan beam emerges onto the input face of a light detector, with the detector being disposed so that its light-sensitive input surface is parallel to the scanned line. The ends of the tubular light guide are closed by plates having mirrored surfaces. Because the detector is attached to the tubular light guide perpendicularly to the tube axis and scan line direction, a compact structure of the read-out unit is obtained. The light detector can be disposed in a middle region of the tubular light guide, so that the light emitted from pixels of the storage screen in a central region of the storage screen requires only a few reflections before it is incident on the light detector, and thus proceeds to the light-sensitive entry face of the detector substantially unattenuated. Moreover, the detector is disposed close to the scanned line, so that any reflections which do occur require very short distances.

A simple structure for the tubular light guide is that of a half-shell having an open side disposed perpendicular to the storage screen and parallel to the scanning line direction, with the light detector being disposed a slight distance from the open side of the half-shell, so that the scan beam of the read-out radiation source can be conducted between the half-shell and the light detector. The light yield and the linearity of the brightness can be increased by using two light detectors arranged side-by-side. The detectors can be securely fastened, and a particularly stable arrangement of the readout unit results, by covering any open area of the half-shell, which is not occupied by the entry faces of the light detectors, with a mirrored mount for the detectors. This also achieves a good light guidance. The read-out beam, such as a laser beam, is then conducted between the half-shell and the mirrored mount of the detectors.

Light reflected by the surface of the storage screen, which is therefore not wanted for construction of the image, can be eliminated by placing a filter in front of the entry face of each detector.

The tubular light guide preferably has a circular or elliptical cross-section. The number of reflections can be maintained low when the diameter of the tubular light guide is in the range of 100 to 120 mm. A high-grade mirroring having substantially 100% reflection is obtained by covering the surfaces of the tubular light guide with a layer of barium sulfate ($BaSO_4$).

Any correction in the brightness curve which may still be required can be undertaken electronically by topical compensation using known techniques in the computer which constructs the image from the electrical signals corresponding to the emitted light, i.e., the signals from those regions of the latent image from which the light may be more highly attenuated by the structure of the read-out system can be electronically strengthened.

DESCRIPTION OF THE PREFERRED EMBODIMENTS

Figure 1:
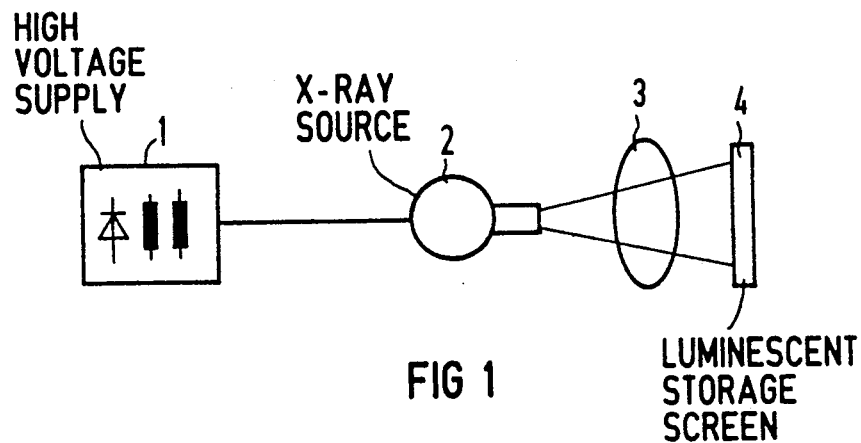
FIG. 1 is a schematic block diagram showing the manner of generating a latent x-ray image in a luminescent storage screen.

FIG. 1 schematically shows the basic components for generating a latent x-ray image in a luminescent storage screen, as is known to those skilled in the art. An x-ray source 2, which is fed by a high voltage supply 1, generates an x-ray beam which irradiates an examination subject 3. Radiation attenuated by the examination subject 3 is incident on a luminescent storage screen 4. The incident radiation produces electronic holes in the storage screen 4, which are held in potential traps of the phosphor, so that a latent image is stored therein.

Figure 2:
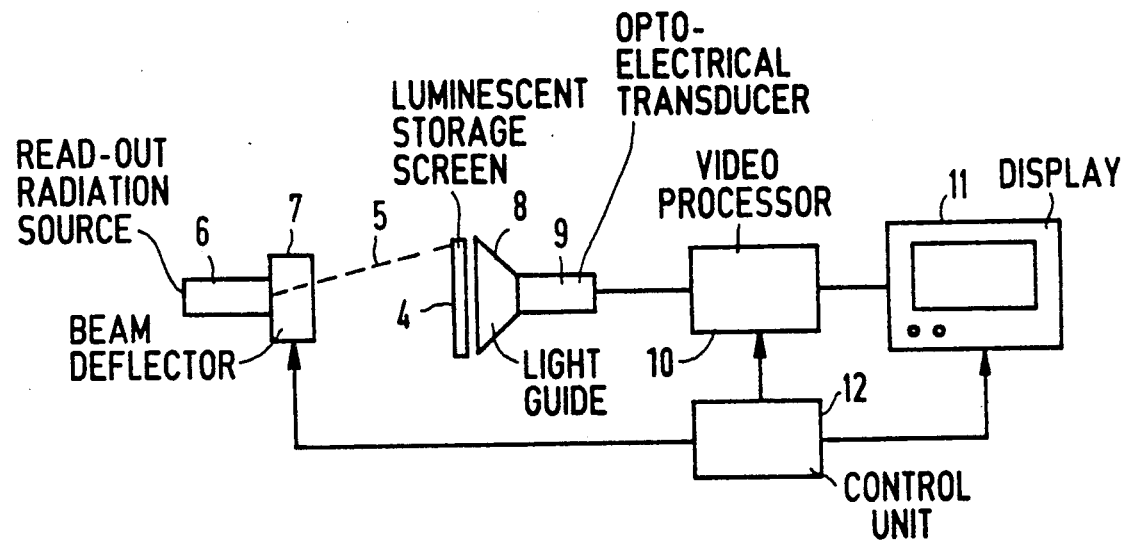
FIG. 2 is a block diagram of a read-out system, in which a light detector constructed in accordance with the principles of the present invention can be used for generating a viewable image of the latent image stored in the luminescent screen.

For reproduction or reading-out of the latent image, the storage screen 4, as shown FIG. 2, is scanned pixel-by-pixel by a read-out radiation beam 5, such as a laser beam. The beam 5 is generated by a read-out radiation source 6 and a beam deflector 7. The beam deflector 7, for example, may be a rotating mirror for the vertical deflection and an electro-optical beam deflector for the horizontal direction. The vertical deflection may alternatively be achieved by a parallel feed of the luminescent screen 4 in a direction perpendicular to the scan line, i.e., advancement in the machine direction. This latter type of vertical deflection is required for the read-out system of the present invention, which means the lines to be scanned extend in the cross-machine direction.

Due to the scanning with the beam 5, all of the pixels of the storage screen 4 are successively excited line-by-line and thereby caused to luminesce. A light guide 8 acquires the light emitted by the storage screen 4, and conducts the light onto an opto-electrical transducer 9, which measures the brightness of the light from the scanned pixels, and converts it into an electrical signal. This signal is supplied to a video processor 10, which generates a video signal for portrayal on a display 11 from the analog output signals of the transducer 9. The video processor 10, as is known, can include image memories, suitable processing circuits, analog-to-digital converters and digital-to-analog converters. A control unit 12 generates clock signals for synchronizing the beam deflector 7, the video processor 10 and the display 11.

Figure 3:
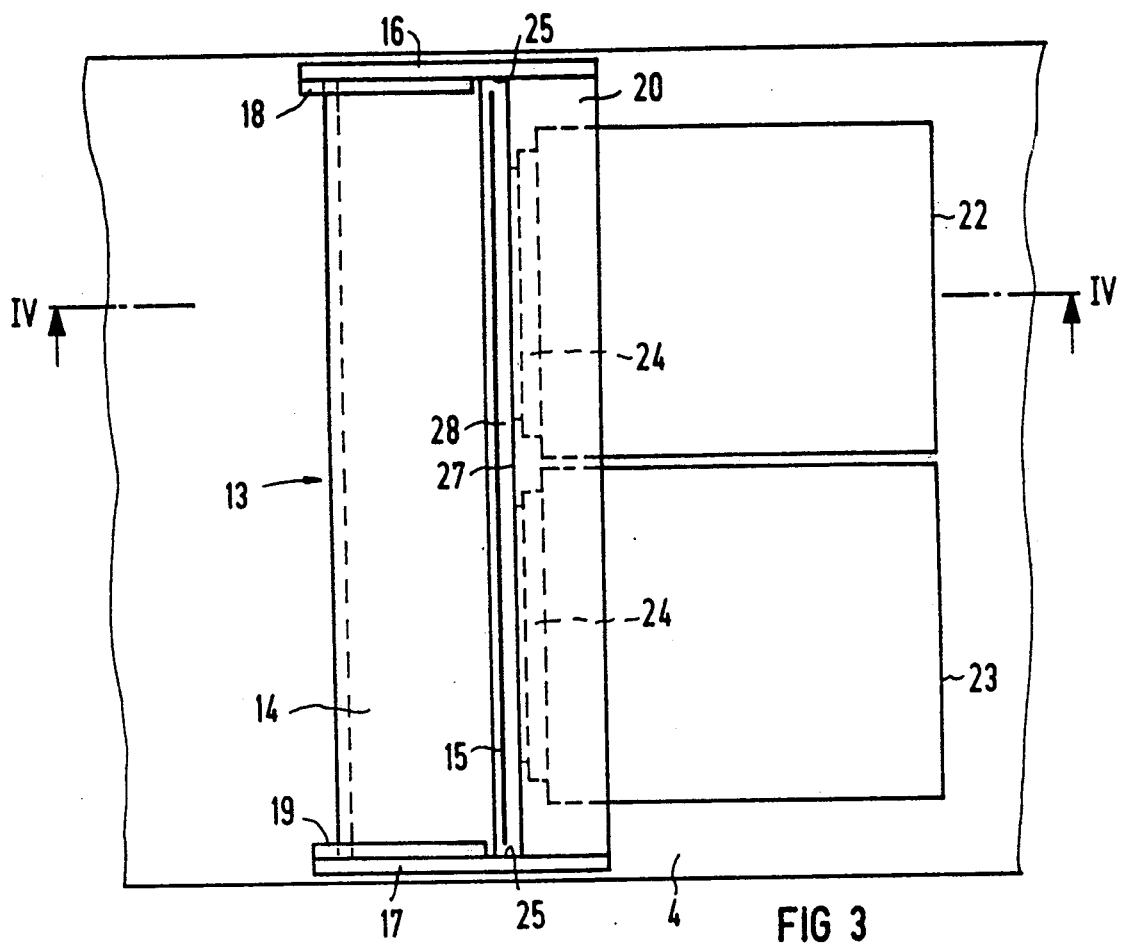
FIG. 3 is a plan view of a light detector for a read-out system constructed in accordance with the principles of the present invention.
Figure 4:
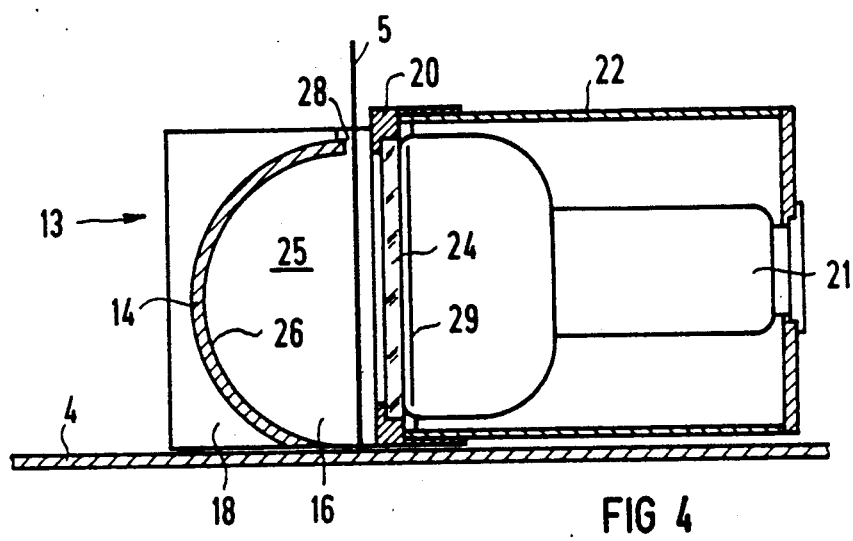
FIG. 4 is a side sectional view, taken along line IV—IV of FIG. 3, of the light detector constructed in accordance with the principles of the present invention.

Details of the structure of the light guide 8 and the transducer 9, in accordance with the principles of the present invention, are shown in FIG. 3. The light guide 8 consists of a tubular light guide 13 in the form of a half-shell 14 which, in the embodiment of FIG. 3, is semi-circular. The open side of the half-shell 14 is disposed substantially perpendicularly relative to the storage screen 4, and proceeds parallel, in the cross-machine direction, to the alignment of the scan line 15 which the beam 5 sweeps on the storage screen 4. The half-shell 14 is laterally bounded by two plates 16 and 17, to which suitably curved holding plates 18 and 19 for the half-shell 14 are attached. A mount 20 which, as can be seen in FIG. 4, has openings for two light detectors 21, is secured to the plates 16 and 17 opposite the half-shell 14. The detectors 21 are surrounded by shieldings 22 and 23 and have light entry faces substantially co-extensive with the opening the half-shelf 14. Filters 24 may be disposed preceding the light detectors 21 to minimize the contribution of light reflected by the surface of the storage screen 4 to the output signals of the detectors 21. The detectors 21 may be photomultipliers having transillumination cathodes.

For good light guidance, the surfaces 25 of the plates 16 and 17, the inside surface 26 of the half-shell 14, and the surface 27 of the mount 20 are mirrored. This can be done, for example, with a coating of barium sulfate, which has a reflectivity of substantially 100%.

The beam 5 which, as described above, is deflected transversely relative to the storage screen 4, passes through a narrow, slot-shaped passage 28 between the mount 20 and the open side of the half-shell 14. The beam 5 thereby sweeps the storage screen 4 along a scan line 15, so that the pixels of the storage screen 4 on the scan line 15 are successively excited and are thereby caused to luminesce. The light emitted by the excited pixels spreads in all directions, and is reflected by the mirrored surfaces 25, 26 and 27 until it is incident on the light-sensitive entry surfaces of the photo-cathodes 29 of the light detectors 21, so that this light can contribute to the electrical output signal.

The light from pixels which lie in proximity to the entry faces of the detectors 21 requires only a short path and a few reflections until it is incident on the photo-cathode 29. As a result, this portion of the light proceeds to the photo-cathodes 29 substantially unattenuated. The pixels which are disposed in the region between the two detectors 21 emit light which requires a somewhat longer distance to reach the photo-cathodes 29, however, this light will be substantially equally received by both detectors 21, so that this light as well results in a substantially unattenuated contribution to the total output signal. Only those pixels which are disposed laterally of the detectors 21 supply a somewhat attenuated signal. This is not a significant problem, however, because usually these portions of the storage screen will be occupied only by non-relevant image portions. It is possible, however, to correct for the decrease of light intensity from the lateral portions of the stored image by suitable known image-enhancing techniques which can be undertaken in the video processor 10.

It is possible to use only one light detector 21 disposed in the middle of the mount 20, instead of the two detectors 21 shown in the embodiment of FIG. 3. Although the sensitivity maximum of the read-out system will thus lie in the middle region, as noted above the critical image information will usually be contained in this portion of the latent image. The sensitivity decrease at the edges of the image can again be corrected by topical enhancement, such as by enhancement of a selected percent at each end of a scanned line. This results in a stimulable phosphor image which appears uniform over the entire scan width of, for example, 40 cm, and which accurately reproduces the modulation of the image caused by the attenuated x-radiation, and otherwise contains no disturbances. This type of image is particularly useful, for example, for achieving a good diagnosis from thorax exposures in which thorax wall regions may lie at the edge of the image in the storage screen.

Although modifications and changes may be suggested by those skilled in the art, it is the intention of the inventors to embody within the patent warranted hereon all changes and modifications as reasonably and properly come within the scope of their contribution to the art.

We claim as our invention:

1. In a system for reading-out a latent image from a luminescent storage screen including means for scanning said storage screen with radiation for causing pixels in a cross-machine line of said storage screen to luminesce as said storage screen is advanced line-by-line in the machine direction, and means for displaying a visual reproduction of said latent image, the improvement comprising:

opto-electrical transducer means for converting light emitted by the pixels of said storage screen into electrical signals for supply to said means for displaying, said opto-electrical transducer means having a light entry face disposed substantially parallel to the cross-machine direction;

a tubular light guide having an interior mirrored surface extending in the cross-machine direction above the advancing storage screen coextensive with and substantially parallel to said lines of said storage screen and formed by a half-shell having a cross-machine opening therein facing and substantially co-extensive with said light entry face of said opto-electrical transducer means so that light from said pixels, is reflected by said light guide directly onto said light entry face, said light guide being spaced from said light entry face to define, in combination with said entry face, a passage for said radiation to said storage screen; and two end plates closing opposite ends of said light guide and each being mirrored on a surface thereof facing said light guide.

2. The improvement of claim 1, wherein said opto-electrical transducer means is a single light detector disposed centrally in the cross-machine direction relative to said light guide.

3. The improvement of claim wherein said opto-electrical transducer means is two light detectors disposed side-by-side in the cross-machine direction, and each having a light entry face forming a portion of the light entry face of said opto-electrical transducer means.

4. The improvement of claim 3, further comprising a mount for said two light detectors having a surface facing said opening of said light guide, said surface of said mount being mirrored and defining, in combination with said light guide and said light entry faces of said light detectors, said passage for said radiation.

5. The improvement of claim 1, further comprising a filter disposed in front of said light entry face of said opto-electrical transducer means for filtering reflections from the surface of said storage plate out of the light which is incident on said light entry face.

6. The improvement of claim 1, wherein said tubular light guide has a circular cross-section.

7. The improvement of claim 1, wherein said light guide has an elliptical cross-section.

8. The improvement of claim wherein said opening of said light guide is in the range of 100 to 120 mm in a direction perpendicular to said machine direction and said cross-machine direction.

9. The improvement of claim 1, wherein said interior mirrored surface of said light guide and said respective mirrored surfaces of said end plates consist of a layer of barium sulfate.

10. The improvement of claim 1, wherein the light reflected by said light guide onto said light entry face of said opto-electrical transducer means exhibits a topical distribution, and wherein said improvement further comprises means for electronically compensating for said topical distribution in the visual reproduction of said latent image.

* * * * *